(12) United States Patent
Wang et al.

(10) Patent No.: US 8,341,081 B1
(45) Date of Patent: Dec. 25, 2012

(54) INTELLIGENT IDENTIFICATION OF ON-LINE BANK ACCOUNTS UTILIZED FOR BUSINESS PURPOSES

(75) Inventors: Gang Wang, San Diego, CA (US); Gary S. Mason, Simi Valley, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/192,453

(22) Filed: Jul. 27, 2011

(51) Int. Cl.
  *G06Q 40/00* (2006.01)
(52) U.S. Cl. ............................................ 705/39; 705/40
(58) Field of Classification Search .............. 705/10–44; 704/1, 4, 9, 49; 707/1–10
  See application file for complete search history.

(56) References Cited

U.S. PATENT DOCUMENTS

| | | | |
|---|---|---|---|
| 6,836,768 B1 * | 12/2004 | Hirsch | 715/225 |
| 7,533,081 B2 * | 5/2009 | De Lury et al. | 1/1 |
| 7,587,672 B2 * | 9/2009 | Wolf | 715/711 |
| 7,870,016 B2 * | 1/2011 | Fazal et al. | 705/7.36 |
| 7,905,396 B2 * | 3/2011 | Tidwell et al. | 235/379 |
| 8,010,454 B2 * | 8/2011 | Engel et al. | 705/45 |
| 8,195,133 B2 * | 6/2012 | Ramer et al. | 455/414.1 |
| 2007/0061244 A1 * | 3/2007 | Ramer et al. | 705/37 |
| 2007/0061247 A1 * | 3/2007 | Ramer et al. | 705/37 |

OTHER PUBLICATIONS

Judy Melanson, Customer loyalty: There's a Lot More to Data Than Just a List of Names and Numers", Financial Services Marketing", New York: Nov./Dec. 2000, vol. 2, Iss. 8; p. 62.*

George Greenwood, "What if your name was stolen ?; Personal Information", Langley Advance, Langley, B.C.:Feb. 10, 2009, p. B.6.*

\* cited by examiner

*Primary Examiner* — Frantzy Poinvil
(74) *Attorney, Agent, or Firm* — Vista IP Law Group LLP; Gary D. Lueck

(57) ABSTRACT

Computer-implemented methods, articles of manufacture and systems for identifying an on-line bank account utilized for business purposes. A computer processor receives or determines a name of on-line bank account entered by an account holder. The account name is tokenized or parsed into name segments, which are analyzed using a first or local set of rules that is applied to each individual segment to tag or assign a score to each individual segment, and a second or global set of rules are applied to multiple name segments or groups of segments. Scores generated by application of the first and second rule sets are used to determine whether the customer uses the account identified by the account name for business purposes.

28 Claims, 14 Drawing Sheets

218/610

| Resource / Name Database |
|---|
| name 1 |
| name 2 |
| name 3 |
| ...... |
| name n |

| Segment | Score (600) |
|---|---|
| Name | Score 1 |
| Not Included in Name Database | Score 2 |

| Segment Possessive? | Score (600) |
|---|---|
| Possessive | Score 1 |
| Not Possessive | Score 2 |

FIG. 6C

| Resource / Dictionary |
|---|
| word 1 |
| word 2 |
| word 3 |
| ... |
| word n |

| Segment Included in Dictionary? | Score (600) |
|---|---|
| Dictionary Word | Score 1 |
| Not Included In Dictionary | Score 2 |

| Segment Number | Score (600) |
|---|---|
| Singular | Score 1 |
| Plural | Score 2 |

| Nouns | Verbs | Adjectives | Adverbs |
|---|---|---|---|
| noun 1 | verb 1 | adjective 1 | adverb 1 |
| noun 2 | verb 2 | adjective 2 | adverb 2 |
| noun 3 | verb 3 | adjective 3 | adverb 3 |
| ... | ... | ... | ... |
| noun n | verb n | adjective n | word n |

| Segment Lexical Class | Score |
|---|---|
| Noun | Score 1 |
| Verb | Score 2 |
| Adjective | Score 3 |
| Adverb | Score 4 |

| SEGMENT | NUMBER OF SEGMENTS IN GROUP | LOCATION OF SEGMENT WITHIN GROUP | SCORE |
|---|---|---|---|
| 1 | 2 | 1 | Score 1 |
| 1 | 2 | 2 | Score 2 |
| 1 | 3 | 1 | Score 3 |
| 1 | 3 | 2 | Score 4 |
| 1 | 3 | 3 | Score 5 |
| 1 | 4 | 1 | Score 6 |
| 1 | 4 | 2 | Score 7 |
| 1 | 4 | 3 | Score 8 |
| 1 | 4 | 4 | Score 9 |
| 2 | 2 | 1 | Score 10 |
| 2 | 2 | 2 | Score 11 |
| 2 | 3 | 1 | Score 12 |
| 2 | 3 | 2 | Score 13 |
| 2 | 3 | 3 | Score 14 |
| 2 | 4 | 1 | Score 15 |
| 2 | 4 | 2 | Score 16 |
| 2 | 4 | 3 | Score 17 |
| 2 | 4 | 4 | Score 18 |
| 3 | 3 | 1 | Score 19 |
| 3 | 3 | 2 | Score 20 |
| 3 | 3 | 3 | Score 21 |
| 3 | 4 | 1 | Score 22 |
| 3 | 4 | 2 | Score 23 |
| 3 | 4 | 3 | Score 24 |
| 3 | 4 | 4 | Score 25 |
| ... | ... | ... | ... |

FIG. 9

INTELLIGENT IDENTIFICATION OF ON-LINE BANK ACCOUNTS UTILIZED FOR BUSINESS PURPOSES

BACKGROUND

Embodiments relate to analysis of electronic data such as data of an on-line bank account hosted by a financial institution. On-line banking is very popular, and millions of users manage their accounts utilizing on-line banking. There are many times when an account is opened by a user, but then utilized for business or personal and business purposes. Users, however, may not identify themselves as a business or indicate that the account is utilized for business purposes. For example, account names provided by users may be familiar to the users, but may be incomplete or include a short and often ill-formed text descriptions, which make it difficult to discern the meaning of an account name, and even more difficult to determine whether an account so named is used for business purposes.

Thus, financial institutions often treat users who conduct only personal transactions and who conduct business or business and personal transactions indifferently. It is estimated that the number of such users is on the order of millions. These millions of users of on-line banking services do not receive the benefit of additional business-related account services, software programs or offerings, and support or promotions related to their business activities. Likewise, financial institutions miss out on opportunities to better serve their customers and satisfy customer needs, enhance customer experiences and loyalty to the financial institution, and the opportunity to cross-sell the customer to other products or services.

SUMMARY

One embodiment is directed to a method performed by a processor or computer for determining whether an account is a business account or utilized for business purposes and comprises receiving, accessing or determining a description or name of an on-line bank account entered or selected by an account holder and parsing or tokenizing the name into a plurality of name segments or tokens. The method further comprises applying a first set of rules such as "local" heuristic rules to each of the plurality of name segments individually, and applying a second, different set of rules such as "global" context rules to groups multiple name segments. Thus, one rule set is directed to name segments on an individual basis, whereas another rule set considers combinations of two, three, four or other numbers of segments or tokens. The method further comprises determining whether the on-line bank account is a business account or utilized for business purposes based at least in part upon respective scores generated by applying the first and second sets of rules.

A further embodiment is directed to a computer-implemented method executed by a processor or computer for identifying a business associated with a web feed and providing additional information about the identified business to enrich or enhance the content displayed to the user viewing the web feed. The method comprises receiving or accessing the web feed from an on-line source (such as a website, a TWITTER feed or a Really Simple Syndication (RSS) feed), and parsing or tokenizing the web feed into a plurality of segments or tokens. A first set of heuristic rules is applied to each of the plurality of segments individually, and a second set of context rules is applied to groups of multiple segments. The method further comprises determining that the web feed is associated with a business based at least in part upon respective scores generated by applying the first and second sets of rules, accessing a database to look up the identified business, and determining contact information of the business. The content that is displayed to the user is transformed by enriching or enhancing the original web feed with the determined information so that the original web feed and the new determined information are presented to the user.

Further embodiments are directed to computer program products or articles of manufacture comprising a non-transitory computer readable storage medium embodying one or more instructions executable by a computer to perform a process for identifying an on-line bank account that is a business account or utilized for business purposes and/or identifying a business associated with a web feed and providing additional information about the identified business to enhance web feed content presented to users.

Yet other embodiments are directed to systems configured or operable to identify an on-line bank account that is a business account or utilized for business purposes and/or identify a business associated with a web feed and providing additional information about the identified business. System embodiments comprise or involve a rule engine or processor executing on a computer, which may be the same computer that is the source of account data or web feed, or another computer that receives such data. System embodiments further comprise or involve data resources or databases accessed by the rule processor and utilized to determine scores for segments or tokens of a data feed.

In a single or multiple embodiments involving an on-line bank account, the data feed includes data of a name or description of an account and/or transaction history data. The on-line bank account may be hosted by a financial institution and the computer that is used to perform embodiments may be the same computer that hosts accounts. In other embodiments, the financial institution computer sends or provides access to account data to another computer, which determines whether an account is a business account or used for business purposes.

In a single or multiple embodiments, account data that is analyzed is transformed from its original format as received into a standardized or pre-determined format by normalizing the account name or description (e.g., by removing capital letters) and cleaning the data, e.g., by deleting punctuation from the name or description.

In a single or multiple embodiments, application of the first set of rules or "local" heuristic rules results in assigning respective scores to respective individual name segments or tokens. For example, if a name is parsed into three segments, three scores, one for each segment, will be generated by applying the first set of rules on each segment. The scores can be added, averaged or otherwise processed to generate a composite local score, which is added, averaged otherwise processed with respect to results of applying the second set of rules so that a composite local score and a composite global score are used to determine a final composite score. The final composite score or other derived data indicates whether, or the likelihood or probability, that the on-line account analyzed using the local and global rules is a business account or utilized for business purposes.

In a single or multiple embodiments, the first set of rules is applied so that each segment is tagged or associated with a single score as a result of applying a single rule of the first set of rules to each segment. Each score is for evaluation of a different semantic perspective of whether the account name or description is associated with a business. According to other embodiments, multiple rules are applied to name segments such that one or more segments are tagged with multiple scores. According to one embodiment, each segment is tagged with the same number of scores. A first composite score for each segment can be determined by a sum, an average or a weighted average of the segment or token scores, and a second composite or composite local score can be determined by a sum, an average or a weighted average of the first composite scores or the original scores.

In a single or multiple embodiments, the first or local set of rules that analyze individual segments may involve tagging a segment or assigning a score to a segment based on one or more of a lexical class of the name segment (e.g., whether the segment is a noun, a verb, an adjective, an adverb), a tense (e.g., pressure or past) of the name segment, whether the name segment is singular or plural, and whether the name segment is possessive, whether the segment appears in a dictionary or business name database, and other attributes or criteria that are particular to a specific, individual segment or token. Scores are assigned to these segment attributes based on whether they are more likely to indicate a segment is associated with a personal name or a business name.

In a single or multiple embodiments, the second set of rules is applied to combinations of at least two segments, e.g., two, three, four and other numbers of segments. Application of the second set of rules results in assigning respective scores to respective groups of name segments, and the processor determines whether the on-line bank account is utilized for business purposes based at least in part upon the respective scores for respective groups of name segments. For example, a first group of name segments (e.g., segments 1 and 2) may be tagged with or assigned one or multiple scores, and a second group of name segments (e.g., segments 2 and 3) may be assigned one or multiple scores. For example, the second set of rules may include a rule that tags a segment group or assigns a score to the group based on a context or location of a first name segment relative to at least one other name segment in the group or that utilizes n-gram analysis to determine respective scores.

First composite scores of the respective segments are determined by determining a sum, average or weighted average of the original scores, and the composite scores for each combination can be summed or averaged (e.g. weighted average) to determine a second composite or second global composite score. The local and global composite scores are then processed to determine a final score, which is analyzed to determine whether the account for which account data was received is a business account or utilized for business purposes.

In embodiments involving a web feed, the web feed may include data of or received from a webpage, a social networking site (such as TWITTER), or a Really Simple Syndication (RSS) feed. Embodiments are utilized to enhance or enrich the content of web feeds that are normally displayed to users by determining an identity of a company to which the web feed relates by parsing or tokenizing the web feed, applying the first or local and second or global set of rules to the parsed or tokenized web feed, and determining a business identity, looking up or determining additional information about the business (e.g., map, address, contact information), and then displaying that additional information together with the original web feed content in order to enrich content displayed to the user of the computer. For example, a web feed or data determined from screen scraping may refer to a company by name, and embodiments may be utilize to analyze content of the web feed and generate a hyperlink to the company's website or include an address or map of the company.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIGS. 6A-J illustrates examples of how rules can be expressed to assign scores to certain segments or tokens and different types of data within data resources accessed by a rule processor;

FIG. 9 illustrates one example of a table indicating how a global rule is applied to different combinations of segments or tokens.

DETAILED DESCRIPTION OF ILLUSTRATED EMBODIMENTS

Embodiments relate to analyzing a data feed such as descriptions or names of bank accounts that were entered by an account holder and/or transaction history data of the account such as electronic bill payment data. Embodiments utilize a rule engine that provides semantic intelligence by leveraging heterogeneous data sources or databases to automatically identify an on-line bank account that is a business account or utilized for business purposes. For this purpose, the rule engine applies "local" heuristic rules and "global" context rules to the account name and/or transaction history data, consults respective knowledge resources, and assigns respective scores based on the results of application of those rules with reference to the knowledge resources. A composite score is determined and used to determine whether the account is a business account or used for business purposes. Having this knowledge, financial institutions can then present account cross-selling offers, opportunities or services that may be relevant to personal and/or business activities since the account is utilized for business purposes.

Figure 1:
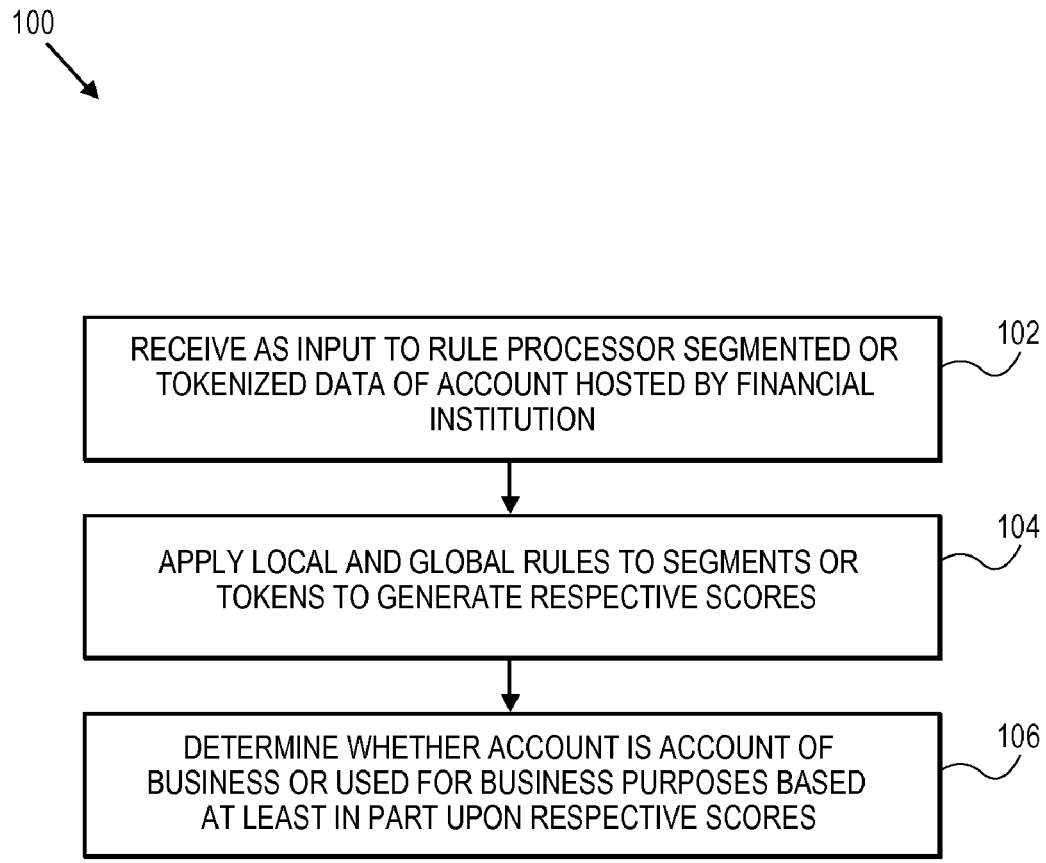
FIG. 1 is a flow diagram of one embodiment of a method for discovering or identifying on-line bank accounts that are business accounts or utilized for business or both personal and business purposes.

For example, referring to FIG. 1, a method 100 for determining whether an account is a business account or utilized for business purposes comprises, at 102, receiving, at a rule engine or processor, an input in the form of account data such as a segmented or tokenized name or description of the account entered or selected by an account holder and/or segmented or tokenized transaction data (such as transaction amounts, transaction frequency, and electronic bill payment data) of the account. At 104, the rule processor applies two different types of rules to the received input: "local" rules, which are applied to individual segments of the input, and "global" rules, which are applied to groups of segments of the input) while referring to heterogeneous data resources as applicable. Application of these different types of rules results in generation of respective local and global scores. At 106, the rule processor determines, based at least in part upon the local and global scores, whether, or the likelihood or probability that, the account is account of a business or used for business purposes.

In this manner, accounts that are determined to be accounts of businesses, business owners or utilized for business purposes can be identified by the financial institution hosting the account or by a third party who informs the financial institution of these business-related accounts, thus presenting business opportunities for cross-selling or more targeted offerings of other products or services related to a customer's business or account activity and providing more incentives to identified customers to remain at their current financial institution rather than opening another account at a different financial institution. Embodiments and aspects thereof are in further detail with reference to FIGS. 2-10.

Figure 2:
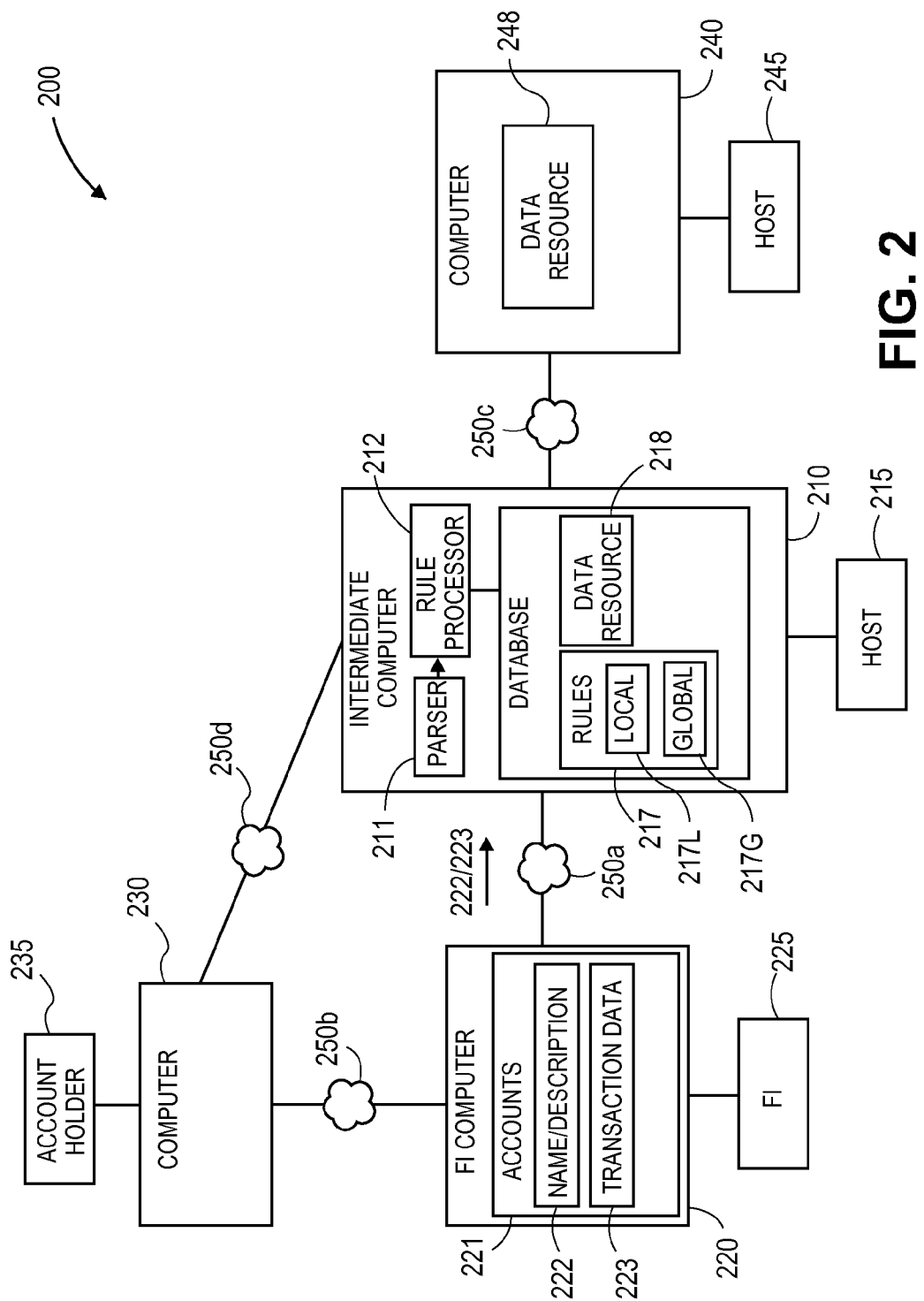
FIG. 2 is a block diagram of one embodiment of a system configured for discovering or identifying on-line bank accounts that are business accounts or utilized for business or both personal and business purposes.
Figure 3:
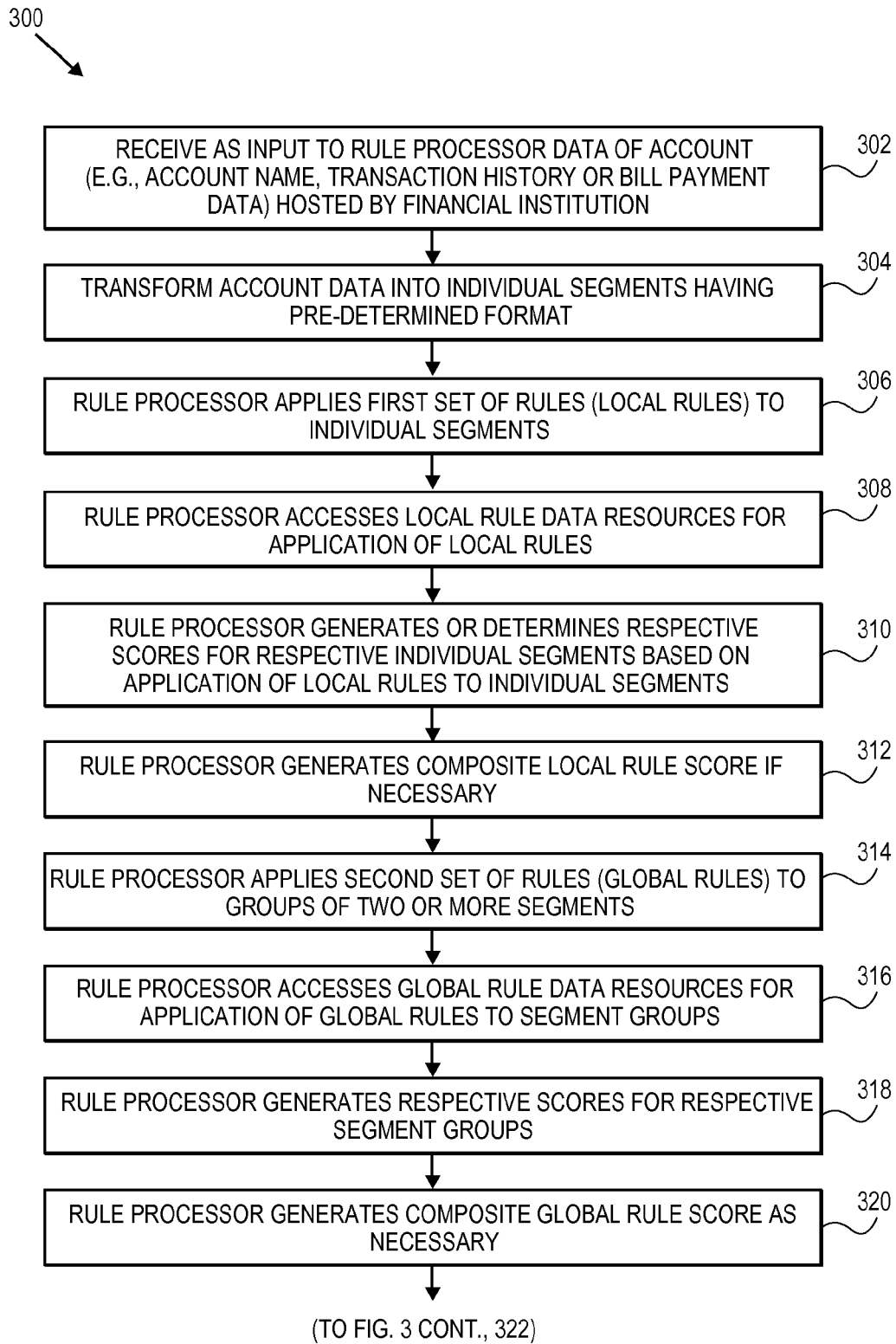
FIG. 3 is a flow diagram illustrating further details of one embodiment of a method for discovering or identifying on-line bank accounts that are business accounts or utilized for business or both personal and business purposes.
Figure 3:
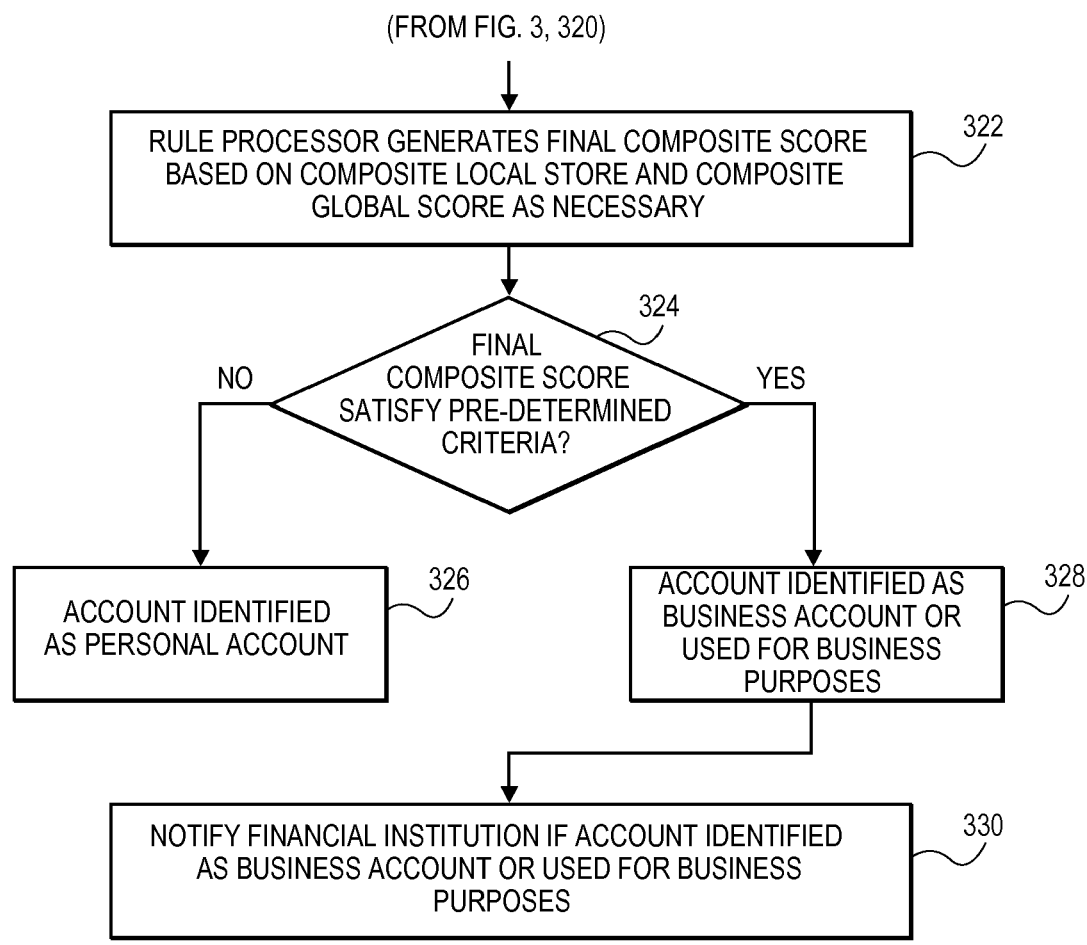

Referring to FIG. 2, a system 200 configured or operable to determine whether an on-line bank account is a business account or utilized for business purposes comprise or involves a computer 210 managed by a host 215 and a computer 220 of a financial institution 225 (generally, FI 225 as shown in FIG. 2) that manages accounts 221 of respective users, customers or account holders (generally, "account holder" 235). The accounts 221 may be savings, checking, money market, credit card and other types of accounts with associated account data (such as balances), account names or descriptions 222 and account transaction histories 223 (such as deposits, withdraws, electronic bill payments). For ease of explanation, reference is made to an account 221, and a description 222 or transaction history 223 of the account 221, but it should be understood that a name and description are both meant to refer to user entered text to identify the account 221.

In the illustrated embodiment, account holders 235 may utilize their computers 230 to access an on-line account 221 by communicating with the FI computer 220. In other system configurations, the host 215 may offers on-line banking services such that the account holder 235 accesses the account 221 hosted by the FI 220 through the host or intermediate computer 210 (generally, intermediate computer 210). One example of a host that offers such services is Intuit Inc., Mountain View, Calif. For this purpose, the account holder 235 may utilize a computer 230 such as a desktop or laptop computer, a tablet computing device, a smartphone or other mobile or computing device capable of communicating with the intermediate computer 210 and/or FI computer 220 through respective networks, and may utilize a browser to navigate screens presented to view and manage an account 221.

The intermediate computer 210 hosts or accesses a parser or tokenizer 211 (generally, parser 211) that receives account data such as account descriptions 222 from the FI computer 220 and transforms the received descriptions 222 into text segments. The text segments are provided as an input to a rule engine or processor 212 (generally, rule processor 212). The parser 211 and rule processor 212 may be separate components (as shown in FIG. 2), or the rule processor 212 may include or embody the parser 211. Thus, references to a rule processor 212 receiving account 221 data to generate segments involves the parser 211 being a module of or utilized by the rule processor 212.

The rule processor 212 executes or applies local rules 217L and global rules 217G (generally, rules 217) to segmented account data. One or more databases 216 store rules 217 and one or more internal heterogeneous data resources 218 that are accessed by the rule processor 212 when applying rules 217. In the illustrated embodiment, the computer 210 hosts data resources 218, which may be internal data resource (such as INTUIT Business Directory in the event that host 215 is Intuit Inc.) and/or the computer 210 may access another computer 240 managed by another host 245 that has one or more external data resources 248 (such as a government database including the U.S. Census Bureau, Data.gov, WordNet, or an external business name directory such as DUNN & BRAD-STREET). For ease of explanation, reference is made generally to a data resource 218, but it will be understood that embodiments may involve one or more data resources 218 managed by host 215 and one or more data resources 248 managed by a third party or other host 248, and that different or heterogeneous data resources 218 may be accessed when applying respective rules 217.

For purpose of communication between system 200 components, the intermediate computer 210 is operably coupled to or in communication with the FI computer 220, account holder computer 230 and one or more computers 240, and FI computer 220 may be operably coupled to or in communication with account holder computer 230 through network 250*d*. Examples of networks 250*a-d* (generally, network 250) and other networks discussed herein that may be utilized for communications between system 200 components include but are not limited to a Local Area Network (LAN), a Wide Area Network (WAN), Metropolitan Area Network (MAN), a wireless network, other suitable networks capable of transmitting data, and a combination one or more or other networks. For ease of explanation, reference is made to a network 250 generally, but various networks 250, combinations of networks 250 and communication systems, methods and protocols may be utilized Referring to FIG. 3, one embodiment is directed to a method 300 for determining, discovering or identifying an on-line bank account 221 that is a business account, utilized for business purposes or utilized for both personal and business purposes. For ease of explanation, reference is made to determining whether an account 221 is utilized for business purposes (e.g., for depositing business-related checks, making business-related payments, or a probability or likelihood, that the account 221 is utilized for business purposes.

The method 300 comprises, at 302, the rule processor 212 receiving the text of data of the account 221 as an input. According to one embodiment, the account data is an account name or description 222 (generally, description 222) that was entered or selected by the account holder 235 when opening the account 221. According to another embodiment, the account data is electronic transaction data 223 such as bill payment data. According to a further embodiment, the account data includes both the description 222 and electronic transaction data 223. For ease of explanation, reference is made to an input to the rule processor 212 in the form of an account description 222 as a particular example of how embodiments may be implemented.

Further, while embodiments may be utilized to analyze multiple accounts 221 and multiple account descriptions 222 of respective account holders 235, reference is made to an account 221 and description 222 generally. However, it should be understood that embodiments may be utilized to analyze tens, hundreds, thousands and other numbers of accounts 221. In the illustrated embodiment in which the computer 210 hosting the rule processor 212 is different than the FI computer 220, text of the account description 222 is transmitted from the FI computer 220 to the intermediate computer 210 through a network 250 and received as an input to rule processor 212.

At step 304, the rule processor 212 (or parser 211 thereof) processes or transforms the received account description 222 into individual segments. For this purpose, the account description 222 may be received by a separate parser 211 or a parser 211 of the rule processor 212.

Figure 4:
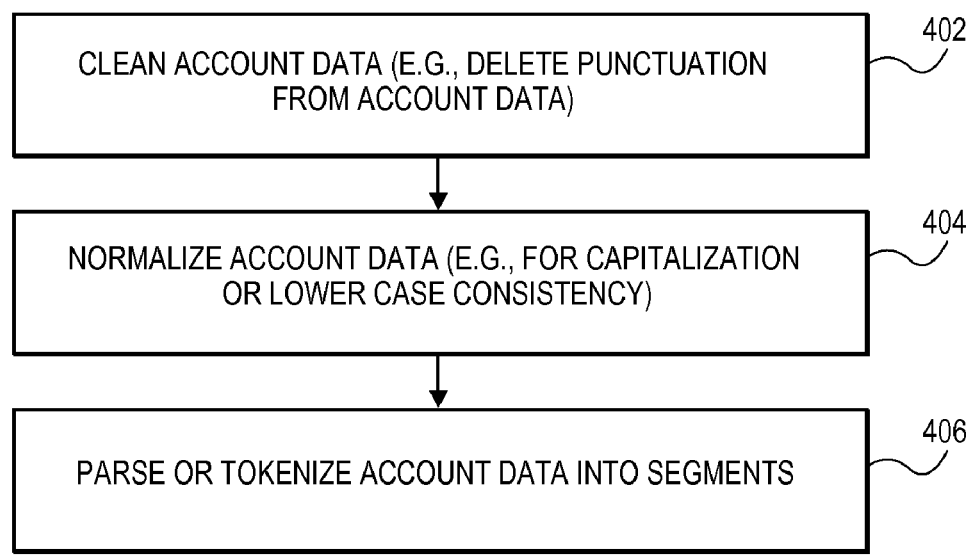
FIG. 4 is a flow diagram illustrating how account data is transformed into a pre-determined format to which local and global rules are applied.
Figure 5:
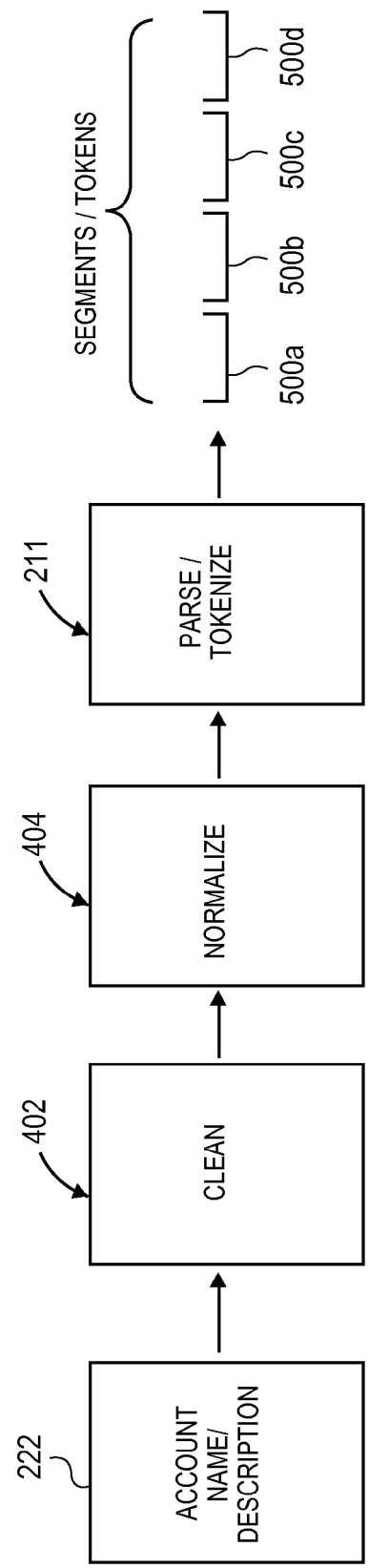
FIG. 5 is a system flow diagram generally illustrating parsing, segmentation or tokenization of account data.

According to one embodiment, and with further reference to FIGS. 4-5, at step 402, the parser 211 or rule processor 212 transforms text of the account description 222 by cleaning 510 the account description 222 by, for example, removing certain or all punctuation such as commas and periods from the description 222 text. For example, the account description 222 may be "Steve Smith's Construction Service L.L.C." and step 402 transforms the description 222 to generate "Steve Smith's Construction Service LLC" following cleaning of the description 222. At step 404, the account description 222 is normalized by, for example, removing capitalization such that the account description 222 is transformed into "steve smith's construction service llc" following normalization. It will be understood that cleaning 402 and normalization 404 may occur in different orders. At step 406, the cleaned and normalized account description is parsed or tokenized into individual segments 500. Continuing with the example above, "steve smith's construction service llc" may be parsed or tokenized into seven segments or tokens: steve, smith, ', s, construction, service and llc.

FIG. 5 generally illustrates four segments or tokens 500a-d (generally, segments 500) generated following steps 402, 404 and 406. It will be understood that the process shown in FIGS. 4-5 may result in various numbers of segments 500 depending on the length and configuration of the account description 222 such that the above example is provided to generally illustrate how embodiments may be implemented.

Referring again to FIG. 3, at step 306, the rule processor 212 applies a first set of rules, e.g., a "local" set of rules 217L ("L" referring to "local" rules), to the segments 500 generated following the transformation process shown in FIGS. 4-5. A "local" rule 217L as utilized in this specification is defined as a rule that is applicable to individual segments 500, independent of other segments 500, and independent of how one segment 500 may relate to another segment 500. When applying local rules 217L to the individual segments 500, at step 308, the rule processor 212 processes a segment 500 by locating or comparing the segment 500 to data within a data resource 218. For each segment 500, the rule engine 212 determines whether to disregard the segment 500 or assign a score to the segment 500. Each segment 500 can be tagged or assigned one or multiple scores at step 310, and the various scores can be summed, averaged or a weighted average can be determined to determine a composite local score.

FIGS. 6A-J generally illustrate how data resources 218 can be structured and how local rules 217L can be applied to data of those data resources 218 to determine a score 600 for a particular segment 500. The rule engine 212 may access or perform look ups in one or more data resources 218 storing data and/or scores associated with respective local rules 217L. For ease of explanation, reference is made to scores 600 from a range of 1-100, where higher scores indicate a higher likelihood or probability that a segment 500 is associated with a business name or an account 221 utilized for business purposes, and lower scores indicate a higher likelihood or probability that the account 221 is used only for personal purposes. It will be understood that other scoring methods may be utilized.

For example, referring to FIG. 6A, according to one embodiment, a data resource 218 is a table or list 610 of proper or human names (e.g., an internally generated data resource 218 or an external name resource 610 such as the U.S. Census Bureau or name website), which includes "steve" as a proper name. Referring to FIG. 6B, a local rule 217L may be configured to assign a segment 500 with a score 600 of "0" or a low score, or eliminate the segment 500 from further consideration due to the segment 500 being a proper or human name. The local rule 217L may be configured to assign a higher score to the segment 500 if the segment searched did not appear within the name resource 610 since absence of a name indicates a higher probability that the account 221 is used for business purposes rather than or not only as a personal account.

Referring to FIGS. 6C, according to one embodiment, a local rule 217L may be configured to assign a segment 500 with a score 600 of "0" or a low score, or eliminate the segment from further consideration due to being an apostrophe or showing possession. Depending on how such a local rule 217L is configured, the apostrophe may be ignored as discussed above, or according to other embodiments, the local rule 217L may be configured to consider the apostrophe as being more significant to indication of a business since it may indicate a possessive that is occasionally utilized to indicate a company owned by the named account holder 235, e.g., "Steve's" construction service.

Referring to FIG. 6D, the data resource 218 may be a dictionary 620 such as an on-line dictionary or related reference resource such as an on-line thesaurus. Referring to FIG. 6E, a local rule 217L may be configured look up each segment 500 in the dictionary 620. If the segment 500 appears as an entry in the dictionary 500, then the local rule 217L may be configured to assign a higher score 600 to that segment 500 to indicate a higher probability that the segment 500 is associated with a business name (e.g., for "construction" or "service"), whereas if the segment 500 did not appear in the dictionary 620 (e.g., segment is a proper name, apostrophe), then the local rule 217L can tag that segment 500 with a lower score (e.g., for "steve").

Referring to FIG. 6F, a local rule 217L may be determine a number reflected by a segment 500, i.e., whether a segment 500 singular or plural. For example, if a segment 500 is singular, it may indicate that the segment 500 is more likely to be associated with a personal account, whereas if the segment 500 is plural, the segment 500 may be more likely to be associated with a business account (e.g., Steve and "Sons") Construction Service. It will be understood that different segments 500 have different singular and plural semantic meanings, and that scores 600 can be assigned to reflect the likelihood or probability that the segment 500 is associated with a business or the account 221 is utilized for business purposes.

Referring to FIG. 6G, the data resource 218 may be lexical database or table 630 including lists of nouns, verbs, adjective, adverbs and other parts of speech or lexical classes. A lexical database 630 may be derived from or based on a dictionary, thesaurus or other similar reference resource. Referring to FIG. 6H, a local rule 217L may be configured look up each segment 500 to determine its lexical class, and then tag or assign a score 600 to that segment 500 based on its determined lexical class. For example, verbs, adjectives and adverbs may be scores higher than nouns since nouns may be more common in descriptions 222 of personal accounts, whereas other descriptions are more commonly used in descriptions 222 of business accounts.

Figure 6I:
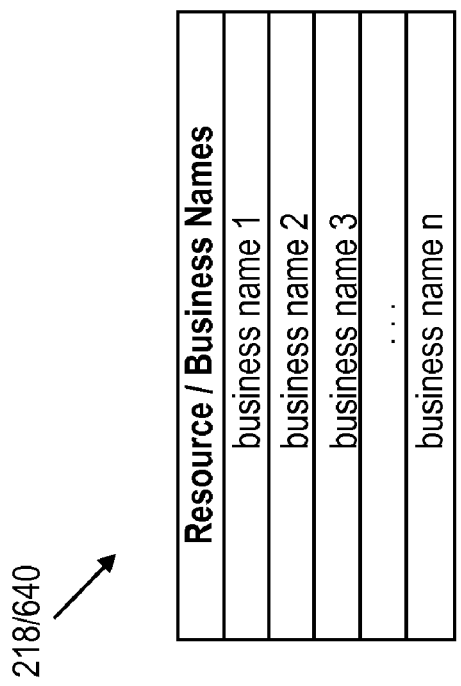

Referring to FIGS. 6I, a data resource 218 is a database or table 640 of common business names (e.g., as determined from resources such as DUNN & BRADSTREET, INTUIT Business Directory, or other resources and websites with lists of business names).

Figure 6J:
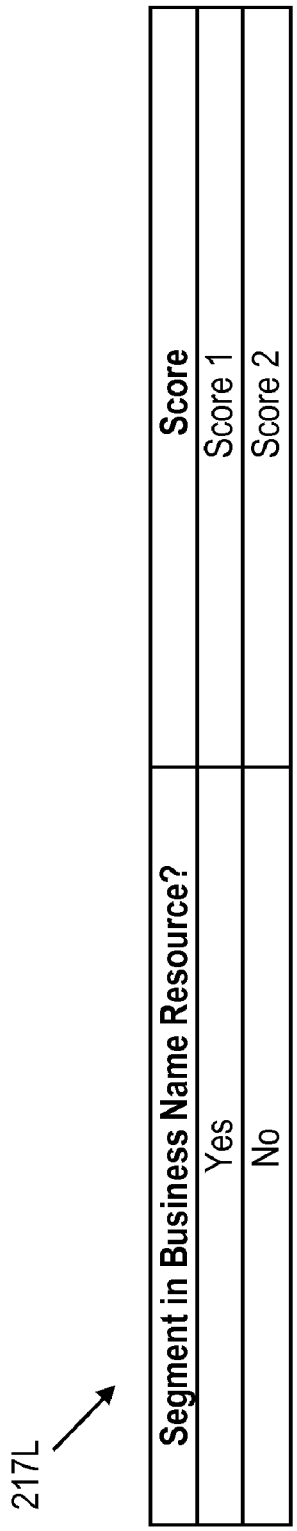

Given the nature and source of such business names, a segment 500 that is found within a common business name database 640 is determined to identify a business with a high degree of confidence, and the resulting score 600 will be a high score that reflecting higher confidence that the description 222 is related to a business account. Referring to FIG. 6J, a local rule 217L may be configured look up each segment 500 in the business name database 640 to determine whether it is included in the business name database. If not, the local rule 217L assigns a lower score 600 to that segment 500, and if so, the local rule 217L assigns a higher score to that segment 500. For example, segments 500 such as "construction" and "service" are likely to be included in a business name database 640 such that the local rule 217L would be configured to assign higher scores 600 to such segments 500.

Figure 7:
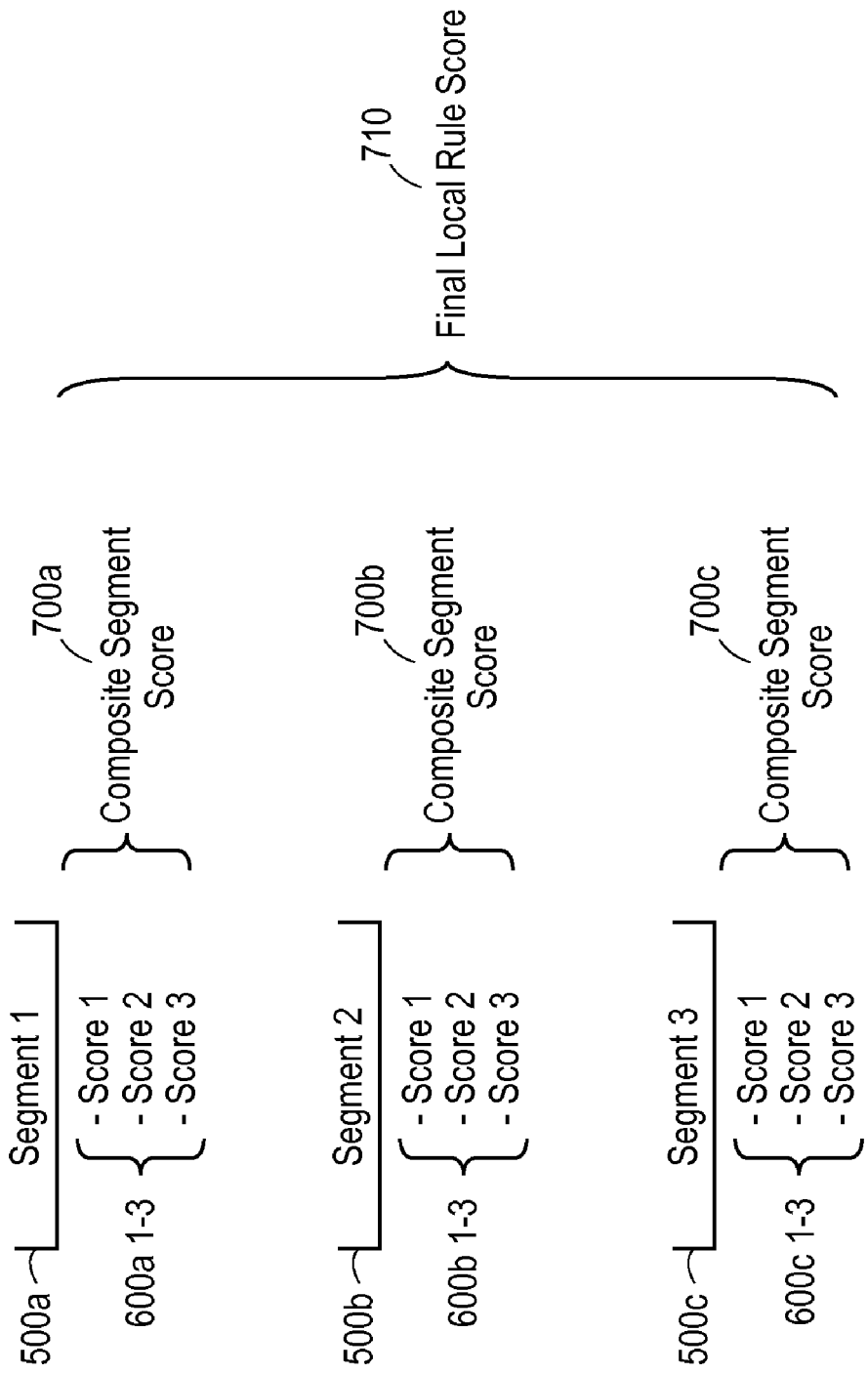
FIG. 7 illustrates application of a local rule to individual segments or tokens.

Referring to FIG. 7, the rule engine 212 determines segments 500 of the account description 222, applies at least one local rule 217L to each segment 500 or to segments 500 that are not eliminated from consideration before application of local rules 217L, and determines corresponding scores 600 to be assigned to each segment 500. In the illustrated embodiment shown in FIG. 7, each segment 500a-c is tagged with or assigned respective scores 600a1-3, 600b1-3 and 600c1-3. The three scores 600a-13, 600b1-3, and 600c1-3 can be further processed, e.g., by determining a sum, average or weighted average thereof, such that the result is each segment 500a-c is tagged with or assigned respective composite segment score 700a-c. As shown in FIG. 7, each of the composite segment scores 700a-c can be further processed, e.g., determining a sum, average or a weighted average thereof, such that the end result generated by the rule engine 212 applying local rules 217L is a local rule composite score 710. It will be understood that the rule engine 212 may generate one or more results or scores 600, 700, 710, and that FIG. 7 is provided as an example of how embodiments may be implemented to apply three local rules 217L to each of three segments 500a-c, each of which was assigned three respective scores 600a1-3, 600b1-3 and 600c1-3, and to determine a final or overall local rule composite score 710.

Referring again to FIG. 3, continuing with step 314, the rule processor 212 applies second set of rules (global rules 217G) to groups of two or more segments 500. For this purpose, at step 316, the rule processor 212 accesses one or more data resources 218 to be utilized to execute global rules 217G. A "global" rule 217G as used in this specification is defined as a rule that is applied to at least two segments 500 collectively, or to a group of at least two segments 500. Thus, a local rule 217L involves individual segments 500 that are not in a group and without regard to other segments 500, whereas a global rule 217G is applicable to multiple segments 500 and may relate to the segment context or how one segment is related to or positioned relative to another segment within the account description 222.

Figure 8:
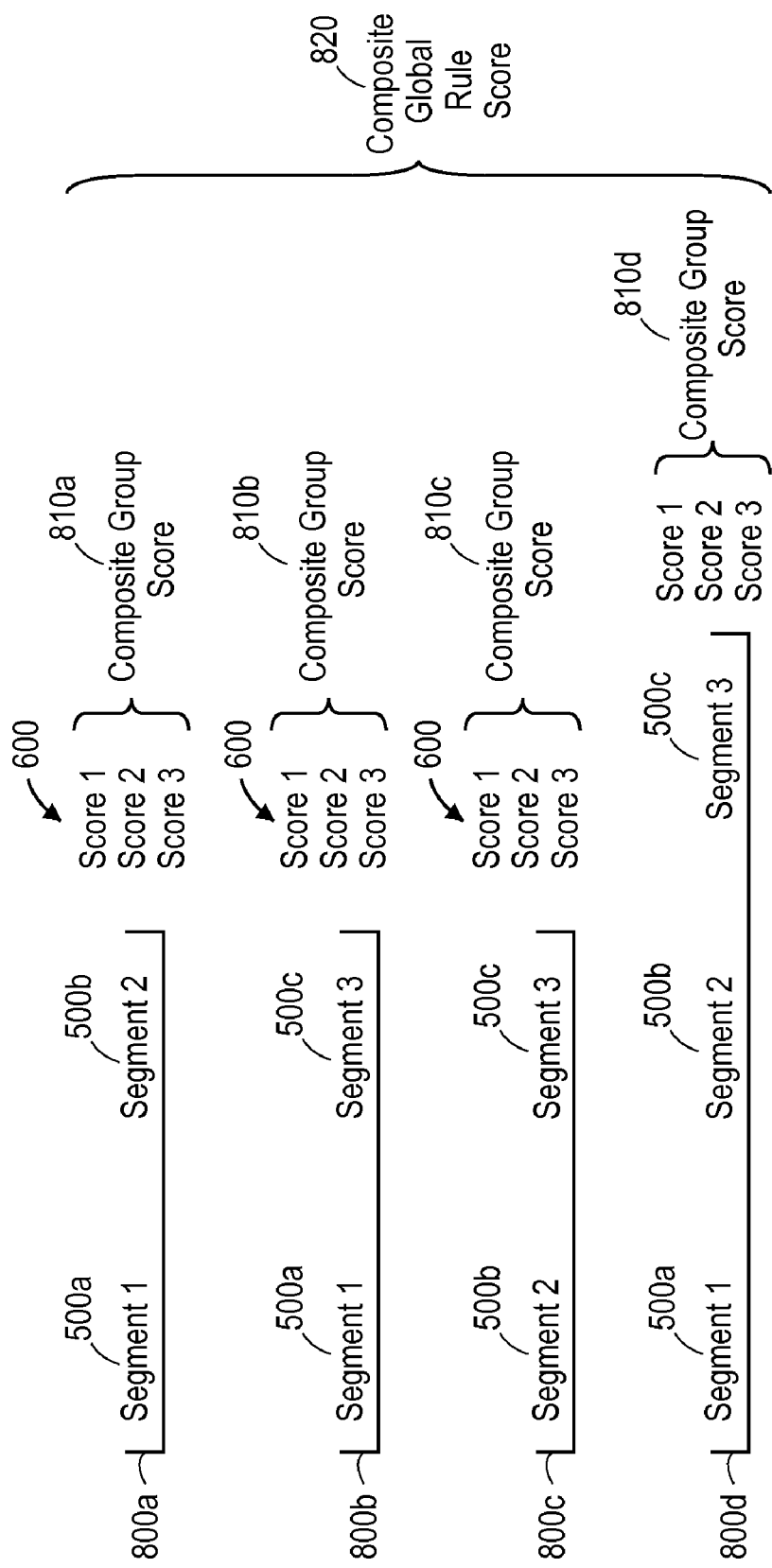
FIG. 8 illustrates application of a global rule to groups of segments or tokens.
Figure 10:
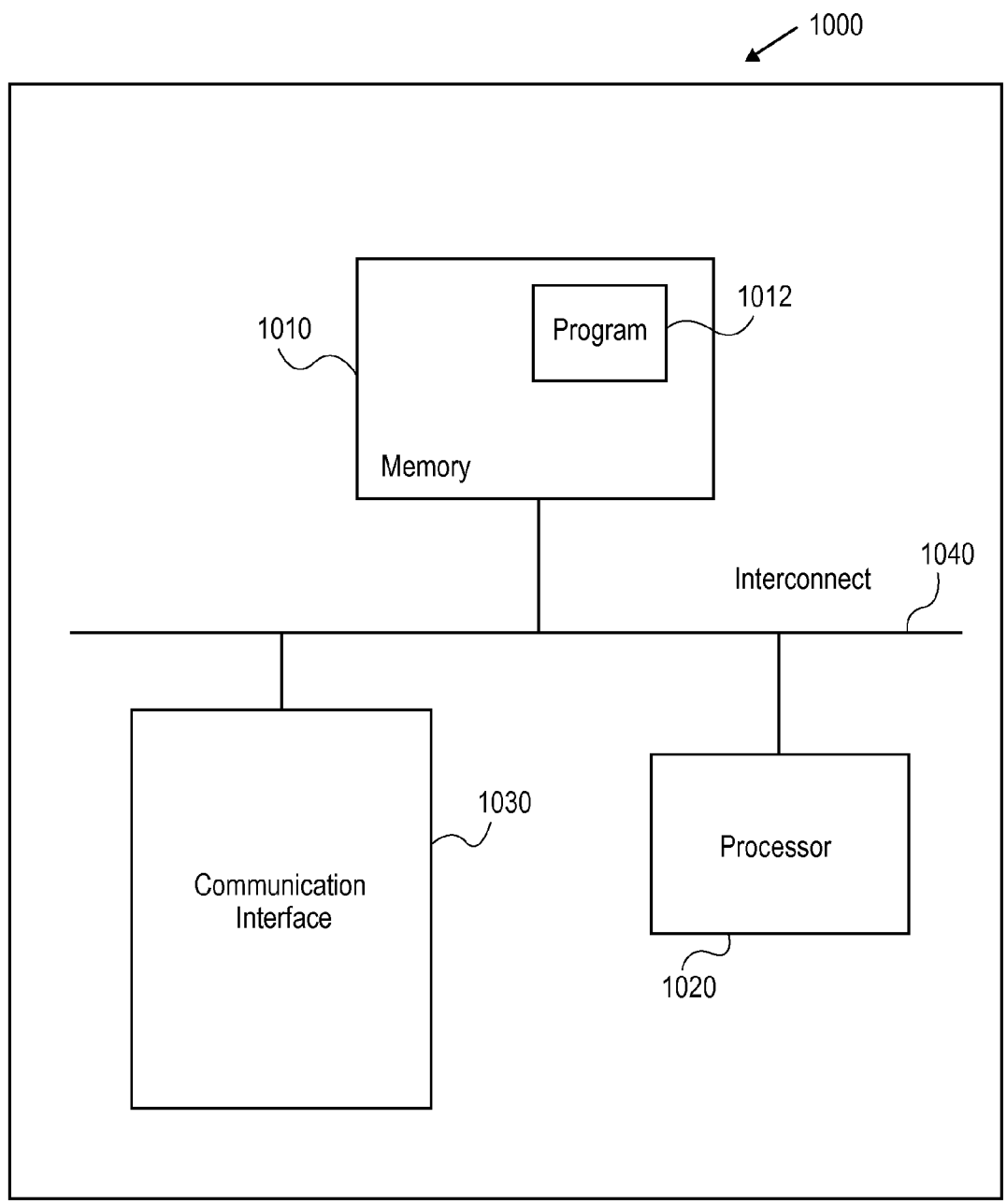
FIG. 10 is a block diagram of a computing apparatus or system in which various embodiments may be implemented or that may be utilized to execute various embodiments.

For example, referring to FIG. 8, global rules 217G are applied to three segments 500a-c in the following segment combinations 800a-d: combination 800a (segments 1 and 2), combination 800b (segments 1 and 3), combination 800c (segments 2 and 3) and combination 800d (segments 1, 2 and 3) (generally, combination 800). Each combination 800 is tagged or assigned with one or more scores 600 (e.g., Scores 1-3 as illustrated in FIG. 8) as a result of application of one or more global rules 217G. As another example, involving four segments 500a-d, global rules 217G are applied to the following segment combinations: segments 1-2, segments 1 and 3, segments 1 and 4, segments 2-3, segments 2 and 4, segments 3-4, segments 1-3, segments 2-4, and segments 1-4 such that each combination is tagged or assigned with its own global scores 600 as a result of application of global rules 217G to each segment combination 600.

Types of global rules 217G that may be utilized in embodiments involve, for example, one or more or all of a position of a particular segment 500 relative to other segments, an n-gram analysis (2-gram, 3-gram, etc.) in which the rule engine 212 attempts to identify co-existence of pairs or other numbers of segments 500 that indicate that the account description 222 is a business name, or an analysis involving WordNet, which is a lexical database that groups words into sets of synonyms or synsets, and records semantic relations between these sets. For example, when considering the segment pair "construction service", this segment pair likely identifies a construction business such that the rule engine 212 would be configured to assign a high score to that particular segment combination.

For example, referring to FIG. 9, a data resource 218 for use with a global rule may be in the form of a database or table 900 with columns identifying a segment 500, how many segments 500 are in a group 800, a location or position of the segment 500 in a sequence of the segments 500 in the group, and an associated score 600. In the illustrated table 900 indicates scores 600 for segments 600 within groups 800 of two, three and four segments, and if that segment being analyzed is the first segment, the second segment, the third segment or the fourth segment within a group of segments.

Continuing with the example provided above, the segment 500 'llc' is the last segment in a group of seven segments, such that the score engine 212 is configured to assign a higher score 600 to this segment 500 for this global rule 217G since business or corporate names often end in an indication of the structure of the business such as limited company (Ltd), limited liability company (llc), limited partnership (lp), limited liability partnership (llp), corporation (corp) are typically at the end of a name, and the global rule 217G recognizes this by assigning a high score 600.

Thus, at step 318, the rule processor 212 generates respective scores 600 for respective segment groups 800 based on application of the one or more global rules 217G, and if necessary, and at step 320, generates composite global scores 810a-d (e.g. sum, average, weighted average) and/or composite global rule score 820 (e.g., sum, average, weighted average) as necessary.

At step 322, in the illustrated embodiment, the rule processor 212 generates a final composite score based the sum, average or weighted average of the composite local score 710 and the composite global score 810. At step 324, the rule processor 323 determines whether the final composite score satisfies pre-determined criteria, e.g., the final composite score is higher than a minimum score indicating that the account description 222 is, or is more likely, a business name or used for business purposes. For example, with a range of 1-100, the final composite score may have to be at least 70. If not, then at step 326, the account 221 for which data was processed by the rule processor 212 is determined to be a personal account or an account that is not a business account or utilized for business purposes. However, if the final composite score satisfies the pre-determined criteria, then at step 328, the account 221 is identified as a business account or used for business purposes, or the final composite score can be reflected as a likelihood or probability that the account 221 is a business account or used for business purposes.

For example, a composite score of 75 may indicate that he account is likely a business account (where 75 is not related to probability), or such a score 600 may indicate that the probability that the account 221 is a business account is 75% if the local and global rules 217L, 217G are so configured. At step 330, the FI 225 or another entity such as a marketing company is notified of the accounts 221 identified as being a business account or utilized for business purposes.

FIG. 13 generally illustrates certain components of a computing device 1300 that may be utilized to execute embodiments and that includes a memory 1310, program instructions 1312, a processor or controller 1320 to execute instructions 1312, a network or communications interface 1330, e.g., for communications with a network or interconnect 1340 between such components. The memory 1310 may be or include one or more of cache, RAM, ROM, SRAM, DRAM, RDRAM, EEPROM and other types of volatile or non-volatile memory capable of storing data. The processor unit 1320 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1340 may include a system bus, LDT, PCI, ISA, or other types of buses, and the communications or network interface may, for example, be an Ethernet interface, a Frame Relay interface, or other interface. The network interface 1330 may be configured to enable a system component to communicate with other system components across a network which may be a wireless or various other networks. It should be noted that one or more components of computing device 1300 may be located remotely and accessed via a network. Accordingly, the system configuration provided in FIG. 13 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1320 performs steps or executes program instructions 1312 within memory 1310 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, embodiments may involve a FI computer embodying the rule processor so that the FI itself performs the processing. In other embodiments, a third part or host performs the analysis and may then inform the FI of the results.

It will be understood that various numbers and types of local rules and various numbers and types of global rules, and various combinations of local and global rules may be applied to account data segments. Thus, it will be understood that a given segment may be tagged with or assigned one, two, three, four and other numbers of scores.

For example, while application of certain local rules were described as involving proper names, a dictionary, presence of an apostrophe, singular or plural segments, a lexical classification of a segment, whether a segment appears with in a business name database, scores to such segments, it will be understood that other local rules and data resources and combinations thereof may be utilized.

Further, while certain embodiments are described with reference to local rules being applied to segments first before global rules, the particular sequence can be changed such that global rules are applied first, or multiple rules are applied simultaneously. Moreover, data resources accessed by local and global rules may be resources managed by a host or external resources.

Further, individual segment scores can be summed or averaged, and local and global scores can be summed or averaged to determine a composite score that is used to determine whether the account is utilized for business purposes.

Additionally, while certain embodiments are described with reference to parsing or tokenizing an account name, embodiments may involve parsing or tokenizing electronic transaction data (such as payee names of electronic bill payments).

Moreover, while certain embodiments are described with reference to determining whether an account is a business account or utilized for business purposes, embodiments may also be utilized to analyze other types of data feeds to identify a business associated with the feed and provide additional information to the user of the data feed to enrich or enhance the data feed content provided to the user.

For example, another embodiment is directed to identifying a business associated with a web feed and providing additional information about the identified business. The method involves a rule processor receiving the web feed from an on-line source (such as a website, a social networking site such as TWITTER or FACEBOOK, or a Really Simply Syndication (RSS) feed), and then parsing or tokenizing the web feed into a plurality of segments. The rule processor applies local rules to each of the plurality of segments individually, and a global rules to groups of multiple segments, and then determines whether the web feed is associated with a business based at least in part upon respective scores generated by applying the local and global rules. If so, then the rule processor can access a database to determine contact information of the business (e.g., address, phone number, map, or hyperlink to such information), and integrate that data into the web feed such that the web feed is displayed together with the additional information, thereby enhancing or enriching the web feed content that is displayed to the user of the computer.

Moreover, it will be understood that embodiments may be utilized with or executed concurrently with systems and methods for analyzing abbreviations within names or descriptions of an on-line bank account or other data feed, as described in further detail in U.S. application Ser. No. 13/192,363 filed on the same date herewith, and entitled "Systems Methods and Articles of Manufacture for Analyzing On-line Bank Account Data Using Hybrid Edit Distance," the contents of which are incorporated herein by reference.

While multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

APPENDIX

Following is a sample log file generated by implementation of embodiments demonstrating how tokenization of account names or descriptions and application of local and global rules with reference to respective data resource were able to identify accounts utilized for business purposes. The listing of account descriptions are organized into a group of account descriptions that were identified by embodiments (and by a human for comparison) as being a business account or utilized for business purposes, and a group of account descriptions that embodiments were able to identify as being a business account or utilized for business purposes where a human failed to identify the account for this purpose.

For purposes of this demonstration, the following pseudo code includes examples of rules that may be utilized, and which are provided as non-limiting examples of how embodiments can be implemented:

Lines beginning with // are comments to help readability
S1, S2, . . . are positive weights generally as float numbers. These weights may be obtained with other analyses, e.g., making them dependent on data discussed. For ease of explanation, constants are utilized in the pseudo code. Weights can be learned or adapted, offline or online.

```
// preprocessing and cleansing
phrase = preprocessing(account_name)
// tokenization
tokens = tokenization(phrase)
// compute local rules
local_score = 0
foreach w in tokens:
    // rule: check human name database
    if w.isFoundInHumanNameDB:          local_score -= s1
    // checking with English dictionary such as WordNet
    if w.isFoundInDictionary:
        // rules to deal with allowed POS'es
        if w.isAdjective:        local_score += s2
        if w.isAdverb:           local_score += s3
        if w.stem.isVerb:        local_score += s4
        if w.isNoun:             local_score += s5
    else:
        //if not found in dict, assume it can be used as human name
        local_score -= s6
    //rule: deal with things like "Gary's"
    if w.isPossessing:              local_score += s7
    //rule: deal with high confident words, such as LLC and Inc.
    if w.isHighConfidenceWord:      local_score += s8
end
//compute global rules
//rule: all tokens in the array can be used for names:
global_score -= s9 if (w.canBeUsedAsHumanName for w in tokens)
```

-continued

```
//rule: if there are digits in phrase
global_score += s10 if (phrase.re.match.'.*[0-9]+.*')
//rule: if the length is too long, such as 5
global_score += s11 if (len(tokens) > 5)
//rule: check high frequency bi-grams, such as:
// "Law Office" or "Baptist Church"
global_score += s12 if (tokens.contains.highFreqBiGrams)
```

Total: 4267, Total time: 33 seconds, Average time: 0.007955 seconds Embodiments and human both identified 207 descriptions of accounts utilized for business purposes:
    153 North Milwaukee
    1535 Llc
    239 Wisconsin Llc
    4k Commercial Properties, Llc
    A Feathered Nest Llc
    A Swift Transition Inc
    Abeyta Locksmith, Inc
    Adam P Siegel Md
    Adancho Properties, Llc
    Adonai Investments, Llc
    Advanced Bookkeeping Services Llc
    Advanced Installers Inc
    Aglow Tan Inc
    Aidan Farley Benefit Fund
    Aka Properties, Llc
    All Pest Control
    Alternative Energy Development Corp
    American Prosthetic Components Inc
    Americana Times Inc
    Angler's Haven
    Arjan Llc
    Ast Logistics Llc
    Atoris Eel Llc
    Az Chapter Of Uslacrosse
    Badgercryo Services Llc
    Base Camp Inc
    Baylon Inc
    Blackbird Naturals Llc
    Blind Faith Holdings Llc
    Blue Star Editorial Services Inc
    Bumble Bee Poker Llc
    C&s Limited Prtnsp "a"
    Capputan Gourmet Coffee & Tanning Salon
    Cardanz Enterprises Llc
    Catch 22 Creative Inc
    Cazier Enterprises Llc
    Central Valley Ltl Leagu
    Chekouras Builders Inc
    Chibardun Telephone Cooperative Inc
    Christen Schneider Llc
    City Of Green Bay
    Clear Skies Communications Inc
    Common Threads Family Resource Center
    Companion Care Inc
    Cooper Miller, Inc.
    Cottrell Aviation, Llc
    Covenant Presbyterian Church
    Crafting Sisters
    Custom Design Furniture
    Custom Performance Mechanical Llc
    Deutschs Inc
    Devinder Sidhu,md,sc
    Diamond/laser Services Inc
    Diane Maritato Realty Llc
    Digital Marketing Fx Llc Dna Golf Inc
Dooley Metal Works
Doro Inc
Esp Group, Llc
Express Dry Cleaning, Inc
Expressive Stain & Paint
Facestation Inc
Fdr Trucking
Feldt For State Treasurer
Fine Finishes Unlimited Inc
Firefly Trading Company Llc
Firehouse Performance Llc
Five Star Antiques Mall Llc
Flosweet Management Company
Flynn Fleming Llp
Forever Green Sprinkler Systems
Fps,llc
Franklin Little League Inc
Gem Development Llc
Gina Logic
Git-r-done Moving Services Llc
Glory Rd Ministries Inc
Glr Properties, Llc
Gold Bear Trading Co
Goodden Company Llc
Goodwill Industries
Great Lakes Era Inc
Great Lakes Plastic Surgery Sc
Griffin Gosnell Llc
Harborside Academy Ptso
Hearing Care Associates Inc
Help At Home Llc
Heritage Electrical Contracting Inc
I90 Enterprises Llc
Impact Powder Coating Llc
Independent Bookkeeping
Industrial Oem Specialists Inc
Intentions Of Seven Hills, Llc
J & R Truck & Trailer Llc
Janafirst Inc
Janesville Beloit Electrical
Janesville Youth Wrestling Inc
Johnson Investments—Racine
Josephine Chianello Berman Dds
K-bear River Adventures
Karlsen Plumbing Inc
Kelley Design Inc
Kenosha Professional Police Benevolent A
Kent D Nelson Md
Kpv Llc
Krs Enterprises Inc
Lads Development Llc
Lazy L Farm Services And
Liberty Cross Ministries
Link Manufacturing Ltd
Loch Construction Company Incorporated
Loch Walls Inc
Logos And Promos Llc
Lot 2 Cg, Llc
Lot 65 Llc
Mad Rock Llc
Maddog Llc
Mainstreet Gourmet Popcorn Llc
Marketing Assoc International Inc
Marriage & Family Therapy Center Sc
Md Millwork Distributors Inc
Melinda K Knight Stone Md
Menomonee Falls Junior Indians Football
Midwest Prairies Llc
Millineum Fiberglass Inc
Miracle On Main Llc
Mk United U17
Mount Horeb Investment And Dev Corp
Muskego Properties Llc
Nature's Edge Therapy Center, Inc.
Naturescape Llc
Neighborhood Watch Inc
Neu Tool & Supply Corp
New Genesis Legal Llc
New Horizons Vision Therapy Center Llc
Newell Enterprises Of Janesville, Llc
North Evergreen Llc
Nw Pro Sharpening
O2d Llc
Oak Creek Urgent Care Llc
Odana Hills Property Llc
One Moore Cup Llc
Orphaned Kanines Inc
Outlook Sheboygan Llc
Park City Rentals Llc
Park Place Chiropractic Llc
Pc Doctors Llc
Pec-valley Towing Inc
Pentecost Lutheran Church
Phi Kappa Sigma
Posey Development, Llc
Providian Development Group Llc
Pure Pool Service
Racine Area Soccer Association Inc
Radon Remedy Llc
Reema Indu Sanghvi Md
Reiff Corporation
Rfp Properties Llc
Richards Concrete Construction Llc
Rick's Custom Woodworking Inc
Rj Jansen Confectionery Equipment Co Inc
Robert H Wagner Family Dentistry Sc
Rock Summer Baseball Inc
Salerno Homes Llc
Sea Nw Consultants Inc
Serenity Therapeutic Massage Llc
Shadow Construction Inc
Sharon Woodward Interior Design
Silverleaf 1618 Llc
Skylighters Of Wisconsin Inc
Smd Family Limited Partnership
Soldiers Of Grace
St John The Baptist Parish
Steven W Campbell Dds
Stipek Properties Llc
Strunc & James Inc
Symmetry Homes Of Wisconsin Llc
Tamron Jewelry Design
Tcb Consolidated Management Llc
Td Corporation
Tender Pines Ranch
Tfw Group Llc
Tga Trucking Llc
The Green Leaf Inn Llc
The Nut Factory Inc
The Truth Ministries
Toijala Chiropractic Clinic Llc
Townshend Cellar, Inc
Trame Trucking Llc Tri-state Auction Service Trust
U S State Quarters Com Inc
Uncle Ds Comedy Un
Uw Parkside Alumni Association Inc
Valley Lutheran High School
Ventura Carpentry Inc
Venturing Crew 70 Bsa
Walter Schroeder Aquatic Center Ltd
Wayne E Spangler Aia Architect
Weber 4 Llc
Weiner Insurance Inc
Wellsys Llc
Western Insurance Resources Inc
William B Tikey Dc Pc
Wisconsin Al-anon/alateen Inc
Wjw Automotive Inc
Women Of The E L C A Greater Milwaukee
World Broadcasting Co Embodiments identified description as business-related, but human did not on 18 items:

Bruce A Semon Md
Clacy Living Trust
Easling Family Trust
Jeffrey J Freitag Md
Jva Sales Llc
Koshkonong Inc
Mark Blumberg Inc
Mark R Jenkins Md
Mattox Family Irrevocable Trust
Montgomery Family Living
Neas Roofing Inc
Ragland Living Trust
Rose E Horak Estate
S Elizabeth Mc Donald
Squires Family Trust
Taylor Living Trust
W O Conant Estate Of
Zittercob Living Trust

What is claimed is:

1. A computer-implemented method for identifying an on-line bank account utilized for business purposes, the method comprising:
   a computer receiving or determining a name of an on-line bank account entered by an account holder;
   the computer parsing the name into a plurality of name segments;
   the computer applying a first set of rules to each of the plurality of name segments individually, and a second set of rules to groups of multiple name segments; and
   the computer determining whether the on-line bank account is utilized for business purposes based at least in part upon respective scores generated by applying the first and second sets of rules.

2. The method of claim 1, the on-line bank account being hosted by a financial institution, the computer being a computer of the financial institution.

3. The method of claim 1, the on-line bank account being hosted by a financial institution, the computer receiving the name of the on-line bank account from a financial institution computer.

4. The method of claim 1, further comprising the computer receiving or determining a transaction history of the on-line bank account, the computer
   parsing the transaction history into a plurality of transaction segments,
   applying the first set of rules to each of the plurality of transaction segments individually, and
   applying the second set of rules to groups of transaction segments, and
   determining whether the on-line bank account is utilized for business purposes based at least in part upon respective results of applying the first and second sets of rules to the name and transaction history of the on-line bank account.

5. The method of claim 1, before applying the first set of rules and the second set of rules, further comprising transforming the name from the name as entered by the account holder into a standardized format by normalizing the name and deleting punctuation from the name.

6. The method of claim 1, applying the first set of rules resulting in assigning respective scores to respective name segments, the computer determining whether the on-line bank account is utilized for business purposes based at least in part upon the respective scores for respective name segments.

7. The method of claim 6, the first set of rules comprising multiple rules that are applied to at least one name segment such that multiple scores are assigned to the at least one name segment.

8. The method of claim 6, the first set of rules comprising multiple rules that are applied to each name segment such that multiple scores are assigned to each name segment.

9. The method of claim 1, at least one rule of the first set of rules specifying a score assigned to a name segment based on a lexical class of the name segment.

10. The method of claim 9, the lexical class being selected from the group consisting of a noun, a verb, an adjective, and an adverb.

11. The method of claim 1, at least one rule of the first set of rules specifying a score assigned to a name segment based at least in part upon one or more of
    a tense of the name segment,
    whether the name segment is singular or plural, and
    whether the name segment is possessive.

12. The method of claim 1, the first set of rules comprising a rule that assigns a score to a name segment based on whether the name segment appears within a dictionary accessed by the computer.

13. The method of claim 1, the first set of rules comprising rule that assigns a score to a name segment based on whether a name segment is included in a business name database.

14. The method of claim 1, applying the second set of rules resulting in assigning respective scores to respective groups of name segments, the computer determining whether the on-line bank account is utilized for business purposes based at least in part upon the respective scores for respective groups of name segments.

15. The method of claim 14, the second set of rules comprising multiple rules that are applied to at least one group of name segments such that multiple scores are assigned to respective groups of name segments.

16. The method of claim 14, the second set of rules comprising multiple rules that are applied to each group of name segments such that multiple scores are assigned to each group of name segments.

17. The method of claim 14, the second set of rules comprising rule that assigns a score to a group of name segments based on whether the group appears within a database comprising phrases of business names or portions of business names.

18. The method of claim 14, the second set of rules comprising a rule that assigns a score to a group of name segments based on a location of a first name segment relative to at least one other name segment in the group.

19. The method of claim 14, the second set of rules comprising a rule that assigns a score to a group of name segments based at least in part upon an n-gram analysis.

20. The method of claim 1 being performed for a plurality of on-line bank accounts hosted by a financial institution.

21. The method of claim 1 being performed for each account of a first plurality of on-line bank accounts hosted by a first financial institution and for each account of a second plurality of on-line accounts hosted by a second financial institution.

22. A computer-implemented method for identifying a business associated with a web feed and providing additional information about the identified business, the method comprising:

a computer receiving the web feed from an on-line source;

the computer parsing the web feed into a plurality of segments;

the computer applying a first set of rules to each of the plurality of segments individually, and a second set of rules to groups of multiple segments;

the computer determining that the web feed is associated with a business based at least in part upon respective scores generated by applying the first and second sets of rules;

the computer accessing a database to determine contact information of the business; and the computer displaying data of the web feed together with the determined contact information to enrich content displayed to the user of the computer.

23. The method of claim 22, the web feed comprising data of an on-line source selected from the group consisting of a webpage, a social networking site, and a Really Simple Syndication feed.

24. The method of claim 22, the contact information comprising a hyperlink to a website of the identified business.

25. The method of claim 22, the contact information comprising at least one of an address and a phone number of the identified business.

26. The method of claim 22, the contact information comprising a map showing a location of the identified business.

27. A computer program product comprising a non-transitory computer readable storage medium embodying one or more instructions executable by a computer to perform a process for identifying an on-line bank account that is utilized for business purposes, the process comprising:

receiving or determining a name of an on-line bank account entered by an account holder, parsing the name into a plurality of name segments, applying a first set of rules to each of the plurality of name segments individually and a second set of rules to groups of multiple name segments, and determining whether the on-line bank account is utilized for business purposes based at least in part upon respective scores generated by applying the first and second sets of rules.

28. A computer program product comprising a non-transitory computer readable storage medium embodying one or more instructions executable by a computer to perform a process for identifying a business associated with a web feed and providing additional information about the identified business, the process comprising: receiving the web feed from an on-line source, parsing the web feed into a plurality of segments, applying a first set of rules to each of the plurality of segments individually and a second set of rules to groups of multiple segments, determining that the web feed is associated with a business based at least in part upon respective scores generated by applying the first and second sets of rules, accessing a database to determine contact information of the business, and displaying data of the web feed together with the determined contact information to enrich content displayed to the user of the computer.

* * * * *

UNITED STATES PATENT AND TRADEMARK OFFICE
CERTIFICATE OF CORRECTION

PATENT NO. : 8,341,081 B1
APPLICATION NO. : 13/192453
DATED : December 25, 2012
INVENTOR(S) : Gang Wang and Gary S. Mason It is certified that error appears in the above-identified patent and that said Letters Patent is hereby corrected as shown below:

In the Specifications

Col. 11, Line 13, replace "13" with --10--
Col. 11, Line 14, replace "1300" with --1000--
Col. 11, Line 15, replace "1310" with --1010--
Col. 11, Line 16, replace "1312" with --1012--, replace "1320" with --1020--
Col. 11, Line 17, replace "1312" with --1012--, replace "1330" with --1030--
Col. 11, Line 18, replace "1340" with --1040--
Col. 11, Line 19, replace "1310" with --1010--
Col. 11, Line 22, replace "1320" with --1020--
Col. 11, Line 28, replace "1340" with --1040--
Col. 11, Line 32, replace "1330" with --1030--
Col. 11, Line 36, replace "1300" with --1000--
Col. 11, Line 38, replace "13" with --10--
Col. 11, Line 54, replace "1320" with --1020--
Col. 11, Line 55, replace "1312" with --1012--, replace "1310" with --1010--

Signed and Sealed this
Fourteenth Day of May, 2013

Teresa Stanek Rea
*Acting Director of the United States Patent and Trademark Office*